M. T. BRADLEY.
BOTTLE.
APPLICATION FILED JULY 29, 1912.
1,068,101.
Patented July 22, 1913.
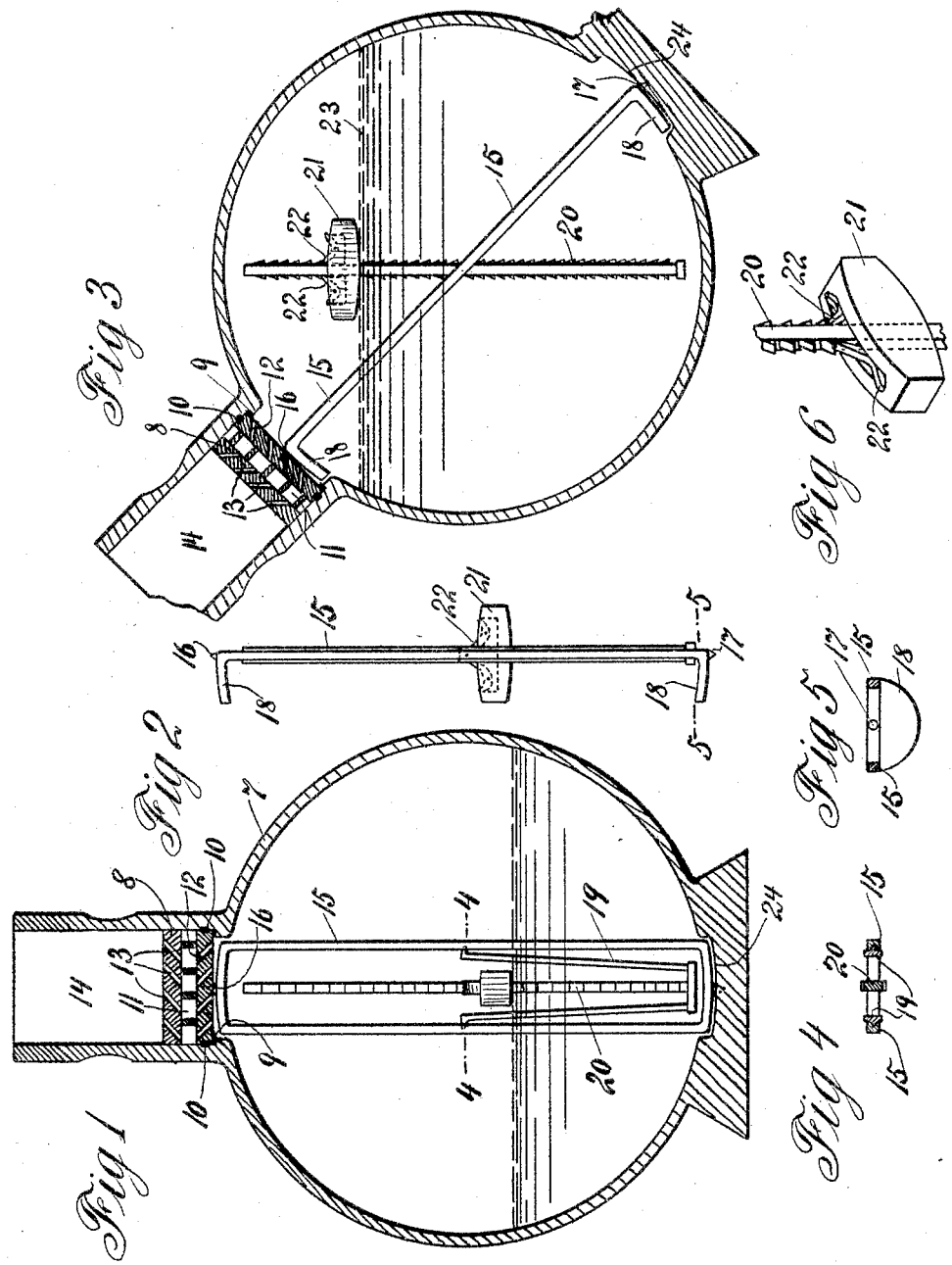

UNITED STATES PATENT OFFICE.

MICHAEL T. BRADLEY, OF NEW YORK, N. Y.

BOTTLE.

1,068,101.  Specification of Letters Patent.  Patented July 22, 1913.

Application filed July 29, 1912. Serial No. 712,054.

*To all whom it may concern:*

Be it known that I, MICHAEL T. BRADLEY, a citizen of the United States, residing at New York city, in the county of New York and State of New York, have invented certain new and useful Improvements in Bottles, of which the following is a specification, reference being had therein to the accompanying drawing.

My invention relates to improvements in means for indicating the removal of liquid from a bottle or other container, and has particular reference to an apparatus having a float adapted to rest upon the surface of the liquid in an upright position at all times.

In the accompanying drawings, I have illustrated in Figure 1 a form of bottle in vertical cross section showing my attachment in position. Fig. 2 is a view of the attachment looking at right angles at the same as shown in Fig. 1. Fig. 3 is a similar view to Fig. 1 except that the bottle is shown in an inclined position and the attachment is shown in the position which it assumes when the bottle is inclined. Fig. 4 is a cross section on the line 4—4 of Fig. 1. Fig. 5 is a cross section at right angles on the line 5—5 of Fig. 2, and Fig. 6 is an enlarged perspective view of the float and part of the rack upon which it rides.

7 is the bottle which may be of any suitable form or shape.

8 is a suitable support or bearing mounted in the base of the neck upon the ledge 9 which may be provided with a suitable gasket 10 and which is provided with suitable spaces such as 11 and cuts such as 12—13 through which the liquid passes, the cork or stopper being adapted to engage the neck 14 of the bottle.

15 is a suitable frame pivotally mounted as shown at 16—17 and is provided with offsets, lugs or ears such as 18 which serve to throw the center of gravity to one side of the frame when the bottle is tilted. Within this frame may be mounted a suitable skup or support such as 19 having secured to the base thereof a suitable rack such as 20 with teeth on both sides of the same.

21 is a float having a central cut away portion through which the rack 20 may slide and has suitably mounted therein pawls such as 22 or other engaging means adapted to prevent the float 21 from being lifted although it allows the float to readily descend upon the rack 20.

23 indicates the liquid in the container. The base of the container is preferably cut away or recessed as shown at 24 to allow the lugs or projections 18 of the framework to clear the main chamber of the container and for this reason the support 8 is preferably secured a short distance up in the neck of the container. From this it will be seen that when the bottle is in the position shown in Fig. 1 it may be filled with any desired liquid and the frame 15 may be introduced in position through the neck of the bottle with the float 21 resting upon the top of the liquid. The support 8 may then be introduced and will be held securely in position by the gasket 10 upon the seating 9 serving to hold the frame in position and allow the same to rotate freely upon the pivots aforesaid. The skup 19 will then swing freely upon its pivots or other suitable bearing thus remaining at all times perpendicular notwithstanding any position in which the bottle may be placed, the frame 15 readily turns and the skup remains perpendicular upon its axis. When a portion of the liquid has been discharged from the vessel or container it will be readily understood that the float 21 immediately rides down upon the remaining liquid, the pawls 22 slipping over the teeth of the rack 20 thus indicating the amount of liquid which has been withdrawn. If any attempt should now be made to substitute the withdrawn liquid, the float cannot rise owing to the engagement of the pawls 22 with the teeth of the rack 20 thus immediately indicating any attempt to replace the withdrawn liquid. The upper and lower surfaces of the float are preferably curved to conform to the inner curvature of the container thus enabling the tell-tale float to show the withdrawal of liquid from the extreme top to the extreme bottom of the chamber.

Of course it will be understood that the float may be constructed differently and that the frame and skup may also be arranged in a different manner. In fact various modifications may be made without departing from the spirit of the invention as claimed.

I claim:

1. In combination with a liquid container, a rotatable frame secured between the top and the base thereof, a rotatable support secured upon said frame, a float upon said support, and means in combination with said float and said support to allow said float to ride upon said support in one direction only.

2. In combination with a liquid container, a rotatable frame secured between the top and the base thereof, a rotatable support secured upon said frame, a float upon said support, and means in combination with said float and said support to allow said float to ride upon said support in one direction only, said support comprising a rack adapted to maintain vertical position with the said container.

3. In combination with a liquid container, a rotatable frame secured between the top and the base thereof, a rotatable support secured upon said frame, a float upon said support, and means in combination with said float and said support to allow said float to ride upon said support in one direction only, said frame having its center of gravity at one side of its center of rotation.

In testimony whereof I affix my signature in presence of two witnesses.

MICHAEL T. BRADLEY.

Witnesses:
THOMAS A. HILL,
P. H. J. DALY.

Copies of this patent may be obtained for five cents each, by addressing the "Commissioner of Patents, Washington, D. C."